United States Patent [19]
Fonda

[11] Patent Number: 5,212,212
[45] Date of Patent: May 18, 1993

[54] ZINC-CONTAINING CERAMIC INK COMPOSITIONS STABILIZED WITH CALCIUM ORGANIC COMPLEX

[75] Inventor: James B. Fonda, Erie, Pa.

[73] Assignee: Lord Corporation, Erie, Pa.

[21] Appl. No.: 868,599

[22] Filed: Nov. 14, 1992

[51] Int. Cl.$^5$ ............ C08F 2/48; C08K 5/04; C03C 17/00
[52] U.S. Cl. .................... 522/79; 522/81; 522/83; 522/96; 522/107; 522/183; 523/160; 524/400; 524/439; 524/425
[58] Field of Search ........ 522/74, 79, 81, 83, 522/96, 103, 107; 523/160; 526/328, 329.6; 524/400, 439, 425

[56] References Cited

U.S. PATENT DOCUMENTS

| | | | |
|---|---|---|---|
| 3,764,571 | 10/1973 | Jennings et al. | 524/394 |
| 4,345,045 | 8/1982 | Jennings et al. | 524/425 |
| 4,390,565 | 6/1983 | Fonda | 427/44 |
| 4,416,974 | 11/1983 | Scheve | 430/288 |
| 4,540,731 | 9/1985 | Gilvary et al. | 524/269 |
| 4,596,590 | 6/1986 | Boaz | 65/60.51 |
| 4,649,062 | 3/1987 | Kosiorek et al. | 427/54.1 |
| 4,684,388 | 8/1987 | Boaz | 65/24 |
| 4,900,763 | 2/1990 | Kraushaar | 522/14 |
| 5,034,444 | 7/1991 | Yun et al. | 524/223 |

FOREIGN PATENT DOCUMENTS 0249117 8/1987 Fed. Rep. of Germany ........ 522/79

*Primary Examiner*—Marion E. McCamish
*Assistant Examiner*—Susan Berman
*Attorney, Agent, or Firm*—W. Graham Buie

[57] ABSTRACT

A zinc-stable ceramic ink composition which contains a metal oxide, a glass frit, a UV-curable vehicle, zinc powder, and a calcium-containing organic complex. The calcium-containing organic complex prevents premature polymerization of the UV-curable vehicle so that the zinc-containing ink composition may be stored for extended periods of time prior to use.

20 Claims, No Drawings

ZINC-CONTAINING CERAMIC INK COMPOSITIONS STABILIZED WITH CALCIUM ORGANIC COMPLEX

FIELD OF THE INVENTION

The present invention relates to the use of ceramic inks or paints to form decorative patterns on a glass sheet. More specifically, the present invention relates to a zinc-containing ceramic ink composition which utilizes an ultraviolet-curable vehicle and which is stabilized by the presence of a calcium-containing organic complex.

BACKGROUND OF THE INVENTION

The utilization of ceramic ink compositions to form decorative patterns on the surfaces of glass sheets is well known. Ceramic ink compositions typically contain one or more metal oxides, a low melting point glass frit, and a vehicle for applying the ink composition to a surface. The one or more metal oxides act as coloring agents for the ink while the glass frit acts as a bonding agent to embed the one or more metal oxides into the surface of the glass sheet to be colored. The vehicle is typically an ultraviolet (UV)-curable composition which, upon exposure to UV radiation, polymerizes and forms a secure film upon the glass surface so that the ceramic ink coated surface can be handled easily. Upon exposure of the coated glass surface to heat, the UV-curable vehicle is burned off while the glass frit is melted so as to imbed the one or more metal oxides into the glass surface.

It is oftentimes desirable to apply a fiberglass-forming die to the glass sheet as it is being heated in order to form the glass sheet to a desired shape. When the heated glass sheet is covered with a ceramic ink, the ceramic ink has a tendency to stick to the fiberglass-forming die which can result in inconsistencies in the ceramic ink coating process. One attempt to solve this problem is disclosed in U.S. Pat. No. 4,684,388 wherein finely divided zinc metal powder is contained within the ceramic ink so as to prevent the ink from sticking to the fiberglass-forming die during the heating process. However, it has been found that the addition of zinc powder to a ceramic ink composition based on a UV-curable vehicle causes the UV-curable materials to polymerize prematurely, resulting in instability of the zinc-containing composition. Due to the instability of such a zinc-containing UV vehicle-based ceramic ink, the zinc powder must be mixed with the ceramic ink immediately prior to application. The handling and mixing of zinc powder on the site of application is problematic in that the zinc powder is difficult to homogeneously incorporate into the ceramic ink. The zinc powder also poses health and fire hazards through the generation of airborne dust.

A need exists for a ceramic ink composition which can be applied to a glass sheet so as to not stick to a fiberglass-forming die during the heating and shaping of the glass sheet and which does not require the handling and mixing of zinc powder immediately prior to application of the ceramic ink.

SUMMARY OF THE INVENTION

The present invention is a zinc-containing ceramic ink composition based on a UV-curable vehicle, which can be applied to a glass sheet so as to not stick to a fiberglass-forming die during the heating and shaping of the glass sheet, and which does not require mixing and handling of the zinc powder immediately prior to application of the ceramic ink composition. The ceramic ink composition of the present invention comprises a metal oxide, a glass frit, a UV-curable vehicle, zinc powder and a calcium-containing organic complex. It has surprisingly been discovered that the utilization of the calcium-containing organic complex not only stabilizes the zinc powder against settling, but also prevents the premature polymerization of the UV-curable vehicle so that the zinc powder may be mixed with the ceramic ink composition and stored prior to application. The invention also relates to a method of forming or shaping a glass sheet which has been coated with the ceramic ink composition of the present invention.

DETAILED DESCRIPTION OF THE INVENTION

The ceramic ink composition of the present invention comprises a metal oxide, a glass frit, a UV-curable vehicle, zinc powder and a calcium-containing organic complex.

The metal oxide of the present invention can be an oxide of chrome, cobalt, nickel, manganese, iron, and copper, or a mixture of oxides such as the mixture of oxides commonly known as black oxide powder. Various other mixtures of oxides may be utilized in order to create ceramic inks of varying colors as is well known in the industry.

The metal oxide or mixture of metal oxides, because of the manufacturing process, are normally all in their highest oxidation state. A small proportion of the metal oxides in a mixture may be in a lower valence state simply because of manufacturing variability. However, normally the metal oxides of a mixture used as a coloring agent are in their highest oxidation state because of the manufacturing process, and thus the metal oxides of the mixture are nonreactive with one another and nonreactive with any elements or compounds they come in contact with while being heated to a temperature in a range up to 1300° F. in an oxygen-containing atmosphere.

In normal practice, the metal oxide or mixture of metal oxides comprise from about 8 to 25, preferably from about 10 to 20, and most preferably about 16 percent by weight of the ceramic ink composition.

The glass frit of the present invention is a low melting point glass frit typically utilized in ceramic ink compositions as is known in the art such as praseodymium silicate, zirconium silicate or lead borosilicate. Normally, the low melting point glass frit is a lead borosilicate glass frit high in lead content. Any other low melting point glass frit is also suitable, but the lead borosilicate glass is preferred because it is readily available and relatively inexpensive. The glass frit is typically utilized in an amount ranging from about 30 to 50 percent by weight of the ceramic ink composition.

The UV-curable vehicle of the present invention can be any UV-curable vehicle known in the art for use in ceramic ink compositions. Such UV-curable vehicles are disclosed in U.S. Pat. Nos. 4,390,565; 4,416,974; 4,416,974; 4,649,062; and 4,900,763; all of which are incorporated herein by reference.

The UV-curable vehicle of the present invention preferably comprises an acrylate oligomer in combination with a reactive diluent system. The acrylate oligomer can be selected from the group consisting of acrylourethane oligomers, polyester acrylate oligomers, polyether acrylate oligomers and mixtures thereof. The acrylourethane oligomer can be any of the conventional acrylourethanes prepared by reacting an olefinically unsaturated compound with an isocyanate-functional urethane formed by the reaction of an excess of a polyisocyanate with a polyol selected from the group consisting of polyether, polyester, polycaprolactone and polyetherester polyols.

The olefinically unsaturated compounds employed for the preparation of the present acrylourethane oligomers may be monomeric or polymeric and are characterized by the presence of a single isocyanate-reactive moiety such as an active hydrogen group. Preferably, the active hydrogen group is hydroxy. Illustrative of unsaturated addition-polymerizable monomeric organic compounds having a single isocyanate-reactive active hydrogen group are 2-hydroxyethyl acrylate, 2-hydroxyethyl methacrylate, 2-hydroxypropyl acrylate, 2-hydroxypropyl methacrylate, N-hydroxymethyl acrylamide, N-hydroxymethyl methacrylamide, diethylene glycol monoacrylate, diethylene glycol monomethacrylate, glycerine dimethacrylate, trimethylol propane dimethacrylate, reaction products of polyether glycols of acrylic or methacrylic acid and the like.

The preferred olefinically unsaturated compounds are lactone-modified acrylate or methacrylate acid esters (hereinafter "lactone-acrylate adducts") prepared by reacting an appropriate lactone with an acrylate or methacrylate acid ester.

Lactones employed in the preparation of the lactone-acrylate adducts typically have the formula

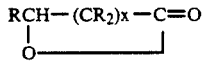

wherein R is hydrogen or an alkyl group having from 1 to 12 carbon atoms, x is from 4 to 7 and at least (x−2) R's are hydrogen. Preferred lactones are the epsilon-caprolactones wherein x is 4 and at least 6 of the R's are hydrogen with the remainder, if any, being alkyl groups. Preferably, none of the substituents contain more than 12 carbon atoms and the total number of carbon atoms in these substituents on the lactone ring does not exceed 12. Unsubstituted epsilon-caprolactone, i.e., where all the R's are hydrogen, is a derivative of 6-hydroxyhexanoic acid. Both the unsubstituted and substituted epsilon-caprolactones are available by reacting the corresponding cyclohexanone with an oxidizing agent such as peracetic acid.

Substituted epsilon-caprolactones found to be most suitable are the various epsilon-monoalkylcaprolactones wherein the alkyl groups contain from 1 to 12 carbon atoms, e.g., epsilon-methylcaprolactone, epsilon-ethylcaprolactone, epsilon-propylcaprolactone and epsilon-dodecylcaprolactone. Useful also are the epsilon-dialkylcaprolactones in which the two alkyl groups are substituted on the same or different carbon atoms, but not both on the omega carbon atoms. Also useful are the epsilon-trialkylcaprolactones wherein 2 or 3 carbon atoms in the lactone ring are substituted provided, though, that the omega carbon atom is not disubstituted. The most preferred lactone starting reactant is the epsilon-caprolactone wherein x in the formula is 4 and all the R's are hydrogen.

The acrylate or methacrylate acid esters utilized to prepare the lactone-acrylate adducts contain from 1 to 3 acrylyl or alpha-substituted acrylyl groups and one or two hydroxyl groups. Such esters are commercially available and/or can be readily synthesized. Commercially available esters include the hydroxyalkyl acrylates or hydroxyalkyl methacrylates wherein the alkyl group contains from 2 to 10 carbon atoms, preferably from 2 to 6 carbon atoms. The hydroxyalkyl acrylates and methacrylates have the following formula:

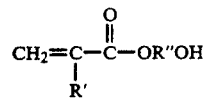

wherein R' is hydrogen or methyl and R" is a linear or a branched alkylene group having from 2 to 10 carbon atoms, preferably from 2 to 6 carbon atoms.

Examples of suitable hydroxyalkyl acrylates and methacrylates include 2-hydroxyethyl acrylate, 2-hydroxypropyl acrylate, 3-hydroxypropyl acrylate, 2-hydroxybutyl acrylate, 4-hydroxybutyl acrylate, 3-hydroxypentyl acrylate, 6-hydroxynonyl acrylate, 2-hydroxyethyl methacrylate, 2-hydroxypropyl methacrylate, 3-hydroxypropyl methacrylate, 2-hydroxybutyl methacrylate, 2-hydroxypentyl methacrylate, 5-hydroxypentyl methacrylate, 7-hydroxyheptyl methacrylate and 5-hydroxydecyl methacrylate.

A molar ratio of the lactone to hydroxyl groups in the ester of from about 1:0.1 to about 1:5, preferably from about 1:0.3 to about 1:3 is used. Generally, a temperature of from about 25° C. to about 150° C., preferably from about 25° C. to about 100° C., is used. Times of reaction vary depending upon the temperature and catalyst used; however, generally, the reaction is allowed to proceed from about 20 minutes to about 10 hours, preferably from about 20 minutes to about 5 hours. Suitable catalysts include sulfuric acid, paratoluene sulfonic acid, stannous octoate and butyl titanate.

The isocyanate functional urethanes for preparing the present acrylourethane oligomers are formed by the reaction of an excess of a polyisocyanate with a polyol. The polyisocyanate compounds which are employed in forming the acrylourethane oligomers in accordance with the present invention can be any organic isocyanate compound having at least two free isocyanate groups. Included within the purview of suitable polyisocyanates are aliphatic, cycloaliphatic, and aromatic polyisocyanates, as these terms are generally interpreted in the art. Thus it will be appreciated that any of the known polyisocyanates such as alkyl and alkylene polyisocyanates, cycloalkyl and cycloalkylene polyisocyanates, aryl and arylene polyisocyanates, and combinations such as alkylene, cycloalkylene and alkylene arylene polyisocyanates, can be employed in the practice of the present invention.

Suitable polyisocyanates include, without limitation, toluene-2,4-diisocyanate, 2,2,4-trimethylhexamethylene-1,6-diisocyanate, hexamethylene1,6-diisocyanate, diphenylmethane-4,4'-diisocyanate, triphenylmethane4,4',4"-triisocyanate, polymethylene polyphenylisocyante, m-phenylene diisocyanate, p-phenylene diisocyanate, 2,6-toluene diisocyanate, 1,5-naphthalene diisocyanate, naphthalene-1,4-diisocyanate, diphenylene-4,4'-diisocyanate, 1,4-cyclohexylene dimethylene diisocyanate, xylene-1,4-diisocyanate, xylene-1,3-diisocyanate, cyclohexyl-1,4-diisocyanate, 4,4'-methylene-bis(cyclohexyl isocyanate), 3,3'-dimethyldiphenylmethane-4,4'-diisocyanate, isophorone diisocyanate, m-tetramethyl xylene diisocyanate the product obtained by reacting trimethylol propane and 2,4-toluene diisocyanate in a ratio of 1:3, and the like. The diisocyanate compounds are preferred, with 4,4'-methylene-bis(cyclohexyl isocyanate) being especially preferred.

The polyol to be reacted with the polyisocyanate can essentially be any polyether, polyester, polycaprolactone or polyetherester polyol or mixture thereof known in the art.

The polyether polyols are well known articles of commerce and are also commonly referred to as poly(alkylene oxide) polyols or polyalkylene ether glycols. They may be represented by the formula $HO(RO)_nH$, in which R is an alkylene radical and n is at least 2. The alkylene radical can be a single chain or can consist of two or more alkylene chains separated from each other by an ether oxygen atom. Preferred poly(alkylene oxide) polyols have from 1 to 9, preferably 1 to 6, carbon atoms in the alkylene chain separating each pair of oxygen atoms and have a number average molecular weight in the range from about 100 to about 4000, preferably about 100 to about 2500. Representative poly(alkylene oxide) polyols include poly(ethylene oxide) polyols, poly(propylene oxide) polyols, poly(tetramethylene oxide) polyols, poly(nonamethylene oxide) polyols, poly(oxy-methylene-ethylene oxide) polyols, poly(ethylene oxide-propylene oxide copolymer) polyols, and poly(pentaerythritolethylene oxide) polyols. Thus the poly(alkylene oxide) polyols will generally have from 2 to 6 hydroxyl groups, with such polyols having 2 hydroxyl groups being currently preferred. Preferred poly(alkylene oxide) polyols are poly(tetramethylene oxide) polyols, poly(propylene oxide) polyols, poly(ethylene oxide-propylene oxide) polyols, and poly(ethylene oxide) polyols, with poly(ethylene oxide) polyols being especially preferred.

The polyester polyols are condensation polymers of an excess of a polyol such as a diol, triol or the like and an aliphatic, cycloaliphatic or aromatic carboxylic acid having at least two carboxyl groups and including anhydrides of such acids. Polycarboxylic acids which may be employed in forming the polyester polyols which are suitable for use in the present invention consist primarily of monomeric carboxylic acids having at least two carboxyl groups or their anhydrides having from 2 to 14 carbon atoms per molecule, with dicarboxylic acids or their anhydrides being currently preferred. Among such useful acids are phthalic acid, isophthalic acid, terephthalic acid, tetrahydrophthalic acid, hexahydrophthalic acid, adipic acid, sebacic acid, maleic acid, glutaric acid, chlorendic acid, tetrachlorophthalic acid, itaconic acid, trimellitic acid, tricarballylic acid, and other known polycarboxylic acids of varying types. It is currently preferred that the polyester include an aliphatic dicarboxylic acid as at least part of the acid component. Polyols utilized to prepare the present polyester polyols include ethylene glycol, diethylene glycol, 1,4-butane diol, 1,3-propane diol, 1,6-hexane diol, trimethylol propane, glycerol, erythritol, pentaerythritol, poly(ethylene oxide) diol, poly(ethylene oxide/propylene oxide) diol and poly(tetra-methylene oxide) diol in various combinations well known in the art. Examples of suitable polyester polyols for use in the invention include poly(tetramethylene adipate)diol; poly(ethylene succinate)diol; poly(1,3-butylene sebacate)diol; poly(hexylene phthalate)diol; 1,3-butylene glycol/glycerine/adipic acid/isophthalic acid) diols and triols and the like.

The polycaprolactone polyols of the present invention are well known and are typically esterification polymers of polycaprolactone diols and triols with polycarboxylic acids such as those discussed above. The polyetherester polyols of the invention may be prepared by conventional esterification techniques employing conventional apparatus. Esterification is generally effected in the presence of an inert atmosphere such as nitrogen. The polyether polyol and non-polyether polyol monomeric and polymeric materials are mixed in a suitable reactor and heated with agitation to a temperature from 60° C. to 100° C. or higher. The acid components are then added and heating with agitation is continued at a temperature and rate such that the water of esterification can be rapidly removed, generally by distillation. The esterification reaction is continued until the acid number is 10 or less and substantially all of the water of esterification and low-boiling impurities are removed. Polyetherester polyols and their preparation are disclosed in detail in, for example, U.S. Pat. Nos. 4,188,455; 4,358,476; and 4,391,686, all of which are incorporated herein by reference.

The acrylourethane oligomers can be prepared by any of several known reaction routes, including, (1) simultaneous reactions of polyisocyanate, polyol and olefinically unsaturated compound; and (2) reaction of polyisocyanate and olefinically unsaturated compound to form an unsaturated isocyanate-functional compound which is then reacted with the polyol, the amount of unsaturated isocyanate being sufficient to consume all hydroxyl groups of the polyol, with any excess isocyanate moieties being preferentially reacted with additional olefinically unsaturated compound. The preferred method of forming the oligomers is a two-step method comprising (i) reacting the polyol with excess polyisocyanate to form an isoycanate-functional urethane prepolymer and (ii) reacting the thus-formed urethane prepolymer with sufficient olefinically unsaturated compound to form an acrylated polyurethane which has substantially no free reactive isocyanate functionality. In forming the acrylourethane oligomers of this invention, there will be employed at least a slight excess of polyisocyanate with respect to the hydroxyl functionality of the polyol. Preferably, the amount of polyisocyanate will be sufficient to provide an NCO-:OH ratio, with respect to the polyol, in the range of about 1.5:1 to 3.5:1, preferably in the range from about 2.0:1 to 2.5:1. The oligomers of this invention can be prepared neat, as can the intermediates in the multi-step processes, but are preferably prepared in the presence of a diluent phase which is copolymerizable with the acrylated urethane oligomer but is otherwise inert during the particular process of preparing the oligomers. The various methods of preparing unsaturated urethane resins are well known and are described in, for example, U.S. Pat. No. 3,700,643.

The polyester or polyether acrylate oligomers useful as the acrylate oligomer of the present invention are well known and are described in, for example, U.S. Pat. Nos. 4,416,974 and 4,900,763, which are incorporated herein by reference.

The acrylate oligomer of the present invention typically comprises from about 20 to 60, preferably from about 30 to 50, percent by weight of the UV-curable vehicle.

As mentioned above, a reactive diluent system is employed in combination with the acrylate oligomer in the preferred radiation-curable vehicle of this invention. Broadly, suitable reactive diluent systems comprise at least one unsaturated addition-polymerizable monomer which is copolymerizable with the acrylate oligomer upon exposure to radiation. The reactive diluent can be monofunctional or polyfunctional. A single polyfunctional diluent can be used, as can mixtures thereof; or a combination of one or more monofunctional reactive diluents and one or more polyfunctional reactive diluents can be used. Such combinations of mono and polyfunctional reactive diluents are presently preferred. Particularly preferred reactive diluents are unsaturated addition-polymerizable monofunctional and polyfunctional acrylic monomers. Acrylic monomers useful as a reactive diluent system are well known and examples of such momomers include isobornyl acrylate, phenoxyethyl acrylate, isodecyl acrylate, hexyl acrylate, cyclohexyl acrylate, 2-ethylhexyl acrylate, octyl acrylate, nonyl acrylate, stearyl acrylate, 2-phenoxy acrylate, 2-methoxyethyl acrylate, lactone modified esters of acrylic and methacrylic acid, methyl methacrylate, butyl acrylate, isobutyl acrylate, methacrylamide, allyl acrylate, tetrahydrofuryl acrylate, n-hexyl methacrylate, 2-(2-ethoxy-ethoxy)ethyl acrylate, n-lauryl acrylate, 2-phenoxyethyl acrylate, glycidyl methacrylate, glycidyl acrylate, acrylated methylolmelamine, 2-(N,N-diethylamino)-ethyl acrylate, neopentyl glycol diacrylate, alkoxylated neopentyl glycol diacrylate, ethylene glycol diacrylate, hexylene glycol diacrylate, diethylene glycol diacrylate, tripropylene glycol diacrylate, tetraethylene glycol diacrylate, pentaerythritol di-, tri-, tetra-, or penta-acrylate, trimethylolpropane triacrylate, alkoxylated trimethylolpropane triacrylate which contains from 2 to 14 moles of either ethylene or propylene oxide, triethylene glycol diacrylate, tetraethylene glycol diacrylate, polyethylene glycol diacrylate, 1,3-butylene glycol diacrylate, 1,4-butanediol diacrylate, 1,6-hexanediol diacrylate, polyethylene glycol diacrylate, combinations thereof, and any corresponding methacrylates thereof. The reactive diluent system typically comprises from about 10 to 65, preferably from about 25 to 50, percent by weight of the UV-curable vehicle.

The UV-curable vehicle of the present invention typically comprises from about 20 to 35 percent by weight of the ceramic ink composition.

A photoinitiator is typically included in the UV-curable vehicle of the invention. The photoinitiator can be any of the known photoinitiators such as benzophenone, benzoin, acetophenone, benzoin methyl ether, Michler's ketone, benzoin butyl ether, xanthone, thioxanthone, propiophenone, fluorenone, carbozole, diethyoxyacetophenone, the 2-, 3- and 4- methylacetophenones and methoxy-acetophenones, the 2- and 3- chloroxanthones and chlorothioxanthones, 2-acetyl-4-methylphenyl acetate, 2,2'-dimethyoxy-2-phenylacetophenone, benzaldehyde, fluorene, anthraquinone, triphenylamine, 3- and 4-allyl-acetophenone, p-diacetylbenzene, 3-chloro-2-nonylxanthone, 2-chlorobenzophenone, 4-methoxybenzophenone, 2,2',4,4'-tetrachlorobenzophenone, 2-chloro-4'-methylbenzophenone, 4-chloro-4'-methylbenzophenone, 3-methylbenzophenone, 4-tert-butyl-benzophenone, isobutyl ether, benzoic acetate, benzil, benzilic acid, amino benzoate, methylene blue, 2,2-diethoxyacetophenone, 9,10-phenanthrenequinone, 2-methyl anthraquinone, 2-ethyl anthraquinone, 1-tert-butyl-anthraquinone, 1,4-naphthoquinone, isopropylthioxanthone, 2-chlorothioxanthone, 2-isopropyl-thioxanthone, 2-methylthioxanthone, 2-decylthioxanthone, 2-dodecyl-thioxanthone, 2-methyl-1-[4-(methyl thio)phenyl)]-2-morpholino-propanone-1, combinations thereof and the like. The photoinitiator or combination of photoinitiators is typically utilized in an amount ranging from about 5 to 15 percent by weight of the UV-curable vehicle.

The zinc powder prevents sticking of the ceramic ink to the fiberglass-forming die during the heating and shaping of the glass sheet. The zinc-containing system may optionally contain finely divided stannous oxide powder to further assist in presenting sticking of the ceramic ink. The zinc metal powder and optional stannous oxide powder are both utilized in an amount ranging from about 5 to 55 percent by weight of the ceramic ink composition. If a combination of zinc oxide and stannous oxide powder is utilized, the two powders together should not exceed about 60 percent by weight of the ink composition. The ceramic ink composition is typically black in color but will become more grey in color upon the addition of zinc powder. If a black color is desired, zinc powder should not exceed about 40 percent. If a grey color is desired, higher amounts of zinc powder, up to about 55 percent, may be used.

The calcium-containing organic complexes of the present invention, which have been found to surprisingly prevent premature polymerization of the UV-curable vehicle caused by the presence of zinc, typically comprise calcium carbonate ($CaCO_3$), and at least one alkaline earth metal salt of an organic acid susceptible to overbasing in which the equivalent ratio of $CaCO_3$ to alkaline earth metal in the salt is 2:1 to 100:1. The complex particles have average crystallite sizes of 25 to 400 Å. A wide variety of organic acids may be utilized to prepare these complexes, including oil-soluble phosphorus acids, carboxylic acids and sulfur acids. The oil-soluble carboxylic and sulfonic acids are preferred. Suitable sulfonic acids are the petroleum sulfonic acids and alkylated benzene and naphthalene sulfonic acids. Particularly preferred calcium-containing organic complexes are derived from an alkyl benzene sulfonic acid and calcium hydroxide and are marketed by Lubrizol Corporation under the tradename IRCOGEL®. The calcium-containing organic complexes are also commonly referred to as basic calcium sulfonate gels. These materials and their preparation are further described in U.S. Pat. No. 3,766,067 which is incorporated herein by reference. The calcium-containing organic complex is typically utilized in an amount ranging from about 0.2 to 8.0, preferably from about 0.5 to 3.0, percent by weight of the ceramic ink composition.

Although the calcium-containing organic complexes of the present invention are known for use as thixotropic agents to adjust film sagging and pigment settling properties in paint and coating formulations, it has presently been unexpectedly discovered that the calcium-containing organic complexes can also act to prevent premature polymerization of a UV-curable vehicle utilized in a zinc-containing ceramic ink composition.

As described above, previous zinc-containing ceramic ink compositions are extremely unstable and can completely gel or harden within a matter of hours upon the addition of zinc powder. The ceramic ink compositions of the present invention, on the other hand, have exhibited stabilities ranging from seven days to more than five months. This allows the ink compositions to be formulated with the zinc powder in a controlled environment so as to minimize the adverse effects of the zinc powder. The zinc-containing ceramic ink composition may then be packaged and shipped or stored for use by an end user who can benefit from the non-sticking properties of the zinc-containing composition without having the burden of mixing the hazardous zinc powder on the site of application.

In order to enhance the storage capability of the present invention, the ink composition may be formulated as a two-part system wherein the UV-curable vehicle is divided between the two parts such that the zinc powder and calcium-containing organic complex are mixed with one or more reactive diluents that have been found to be unusually stable in the presence of zinc powder and the calcium-containing organic complex. It has presently been discovered that certain multifunctional acrylic monomers of the present reactive diluent system exhibit unusual stability in the presence of zinc powder and the calcium-containing organic complex. These unusually stable acrylic monomers for use in a two-part system include tripropylene glycol diacrylate, polyethylene glycol diacrylate, 2-(2-ethoxy-ethoxy)ethyl acrylate, and trimethylol propane propoxylate triacrylate.

The two-part ink composition of the present invention comprises a first part comprising an acrylate oligomer and a second part comprising zinc powder, a calcium-containing organic complex and a reactive diluent selected from the group consisting of tripropylene glycol diacrylate, polyethylene glycol diacrylate, 2-(2-ethoxy-ethoxy)ethyl acrylate, trimethylol propane propoxylate triacrylate, and mixtures thereof. The metal oxide and/or glass frit may be contained in either the first or second part or in both parts depending on the desired viscosity, etc. of the first and second parts. The first part may also optionally contain any remaining portion of the particular reactive diluent system utilized in the two-part system while the photoinitiators may be contained in either or both of the parts. The amounts of the ingredients utilized in a two-part system are the same as the amounts disclosed above for the one-part system. This type of two-part system may be stored for extended periods of time and may then be mixed together and further stored as a stable one-package composition within days or months of the final application.

The ceramic ink composition of the present invention is applied to a glass sheet by a method involving the following steps. The ceramic ink is first applied to the glass sheet by a conventional screen printing process. The glass sheet is then subjected to UV radiation to set up the ceramic ink so that it is bonded to the glass sheet. The glass sheet is then heated to a temperature which softens the glass sufficiently so that the glass sheet can be formed. Generally, this temperature is in a range of about 1175° to 1250° F. and is typically maintained below 1300° F. After heating, the ceramic ink-coated glass sheet is engaged with a fiberglass-covered forming die to form the heated glass sheet into a desired shape. The heating operation acts to burn off all remaining organic material contained in the UV vehicle-based ink composition and binds the remaining portion (i.e., one or more metal oxides) of the ceramic ink to the glass sheet. After the forming die has been removed from engagement with the glass sheet, the glass sheet may be cooled to obtain a formed glass sheet having a ceramic ink pattern. Normally, the glass sheet is rapidly cooled in a glass tempering operation to achieve a tempered glass product having the ceramic ink pattern.

The following examples are provided for the purpose of illustrating the present invention and should not be deemed to limit the scope of the present invention which is defined by the claims.

EXAMPLES 1-5

A two-part zinc-containing ceramic ink composition is prepared wherein Part A contains an aliphatic acrylourethane oligomer, a metal oxide, a glass frit and various reaction diluents and wherein Part B contains zinc powder, a calcium-containing organic complex and a reactive diluent. Specifically, Part A is prepared by combining 302.4 g of a proprietary UV-curable vehicle identified as IC5842-69 and comprised of an aliphatic acrylourethane oligomer, a combination of monofunctional and alkoxylated multifunctional acrylate monomers as reactive diluents, and a photoinitiator system; and 117.6 g of a standard ceramic powder containing a metal oxide and a glass frit. The resulting combination is mechanically mixed using a DISPERMAT ™ mixer to a uniform slurry and then passed through a three-roll mill thus obtaining a smooth, homogeneous mixture identified as IC5842-74 Part A.

Five different B Parts identified as B1-B5 are made by mechanically mixing the following gram amounts of ingredients until a uniform blend is achieved.

|  | Ingredient | | | | |
|---|---|---|---|---|---|
|  | B1 | B2 | B3 | B4 | B5 |
| Zinc powder (7μ avg. particle diameter) | 90.80 | 90.80 | 90.80 | 90.80 | 90.80 |
| Tripropylene glycol diacrylate | 11.08 | 11.08 | — | — | — |
| Polyethylene glycol diacrylate | — | — | 11.08 | — | — |
| Trimethylol propane propoxylate triacrylate | — | — | — | 11.08 | — |
| 2-(2-ethoxy ethoxy) ethyl acrylate | — | — | — | — | 11.08 |
| Ceramic powder (metal oxide and glass frit) | 18.20 | 18.20 | 18.20 | 18.20 | 18.20 |
| Calcium-containing organic complex[a] | — | 3.12 | 3.12 | 3.12 | 3.12 |
|  | 120.08 | 123.00 | 123.00 | 123.00 | 123.00 |

[a]IRCOGEL 905L (Lubrizol Corporation)

To 69.95 g of Part A are added and blended 22.7 g of Part B1 to produce the ceramic ink of Example 1 as the control (no calcium-containing organic complex). The ceramic inks of Examples 2-5 are prepared by blending 69.95 g of Part A with 30.05 g of Parts B2-B5, respectively. The ceramic inks of Examples 1-5 are packaged into clear 4 oz. glass jars with plastic screw tops and stored in a dark area. Periodically, the contents are inspected to assure the inks are still fluid. Gel time is noted when any part of the ink composition is hard and will not redisperse after shaking on a Red Devil paint shaker for 5 minutes. Within 24 hours, the control (Example 1) is gelled. The inks of Examples 2-5 however, remain workable fluids for 7 to 14 days as shown below in Table 1.

TABLE 1

| Time Elapsed | Ex. 1 | Ex. 2 | Ex. 3 | Ex. 4 | Ex. 5 |
|---|---|---|---|---|---|
| 24 hours | gel | fluid | fluid | fluid | fluid |
| 2 days | — | fluid | fluid | fluid | fluid |
| 4 days | — | fluid | fluid | fluid | fluid |
| 7 days | — | fluid | fluid | fluid | fluid |
| 14 days | — | gel | gel | gel | gel |

Note: Examples 1–5 were periodically exposed to equal amounts of fluorescent lighting which may have decreased the stabilities of each of the compositions.

EXAMPLES 6–15

Since different batches of zinc powder obtained from a manufacturer can sometimes have slightly different properties which may affect the stability of a ceramic ink composition, the effectiveness of the present calcium-containing organic complex is tested with respect to five different batches of zinc powder obtained from a manufacturer. Specifically, an A Part is prepared in accordance with Examples 1–5 and a B Part is prepared by combining 90.80 g of zinc powder, 11.08 g of tripropylene glycol diacrylate, 18.20 g of ceramic powder (metal oxide and glass frit) and 3.12 g of IRCOGEL 905L as the calcium-contianing organic complex. Part A (70.0 g) and Part B (100.0 g) are uniformly mixed with a low shear mechanical mixer to formulate the ceramic ink. Examples 6–10 correspond to ceramic inks prepared by B parts containing zinc powder lot numbers 1–5, respectively, while Examples 11–15 are controls which correspond to Examples 6–10 but contain no calcium-containing organic complex.

The inks of Examples 6–15 are packaged into clear 4 oz. glass jars with plastic screw tops and placed into a convection gas-fired air oven at a temperature of 125° F. The jars are periodically inspected to assure the inks are still fluid. Gel time is noted when any part of the ink composition becomes hardened and will not redisperse after shaking on a Red Devil Paint shaker for 5 minutes.

The ceramic inks of Examples 6–10 containing the calcium-containing organic complex remained stable through a period of 79 days while the ceramic inks of Examples 11–15 without the calcium-containing organic complex gelled between periods of 4 and 21 days as shown below in Table 2. The variablity of the batches of zinc powder had no effect on the ability of the calcium-containing organic complex to stabilize the ceramic ink.

TABLE 2

| Time Elapsed | Ex. 6 | Ex. 7 | Ex. 8 | Ex. 9 | Ex. 10 | Ex. 11 | Ex. 12 | Ex. 13 | Ex. 14 | Ex. 15 |
|---|---|---|---|---|---|---|---|---|---|---|
| 2 days | fluid | fluid | fluid | fluid | fluid | fluid | fluid | fluid | fluid | fluid |
| 4 days | fluid | fluid | fluid | fluid | fluid | fluid | fluid | fluid | fluid | fluid |
| 7 days | fluid | fluid | fluid | fluid | fluid | fluid | fluid | gel | fluid | gel |
| 21 days | fluid | fluid | fluid | fluid | fluid | gel | gel | — | gel | — |
| 28 days | fluid | fluid | fluid | fluid | fluid | — | — | — | — | — |
| 35 days | fluid | fluid | fluid | fluid | fluid | — | — | — | — | — |
| 40 days | fluid | fluid | fluid | fluid | fluid | — | — | — | — | — |
| 79 days | fluid | fluid | fluid | fluid | fluid | — | — | — | — | — |

What is claimed is:

1. A ceramic ink composition comprising a metal oxide, a glass frit, a UV-curable vehicle, zinc powder, and a calcium-containing organic complex.

2. A ceramic ink composition according to claim 1 wherein the metal oxide is an oxide of chrome, cobalt, nickel, manganese, iron, copper, or a mixture thereof.

3. A ceramic ink composition according to claim 1 wherein the glass frit is selected from the group consisting of praseodymium silicate, zirconium silicate or lead borosilicate.

4. A ceramic ink composition according to claim 1 wherein the UV-curable vehicle comprises an acrylate oligomer, a reactive diluent system, and a photoinitiator.

5. A ceramic ink composition according to claim 4 wherein the acrylate oligomer is selected from the group consisting of acrylourethane oligomers, polyester acrylate oligomers, polyether acrylate oligomers and mixtures thereof.

6. A ceramic ink composition according to claim 5 wherein the acrylate oligomer is an acrylourethane oligomer prepared by reacting an olefinically unsaturated compound with an isocyanate-functional urethane formed by the reaction of an excess of a polyisocyanate with a polyol selected from the group consisting of polyether, polyester, polycaprolactone and polyetherester polyols.

7. A ceramic ink composition according to claim 1 further comprising stannous oxide powder.

8. A ceramic ink composition according to claim 1 wherein the calcium-containing organic complex comprises calcium carbonate and at least one alkaline earth metal salt of an organic acid susceptible to overbasing in which the equivalent ratio of $CaCO_3$ to alkaline earth metal in the salt is 2:1 to 100:1.

9. A ceramic ink composition according to claim 1 wherein the calcium-containing organic complex is derived from an alkyl benzene sulfonic acid and calcium hydroxide.

10. A ceramic ink composition comprising from about 8 to 25 percent by weight of a metal oxide, from about 30 to 50 percent by weight of a glass frit, from about 20 to 35 percent by weight of a UV-curable vehicle, from about 5 to 55 percent by weight of zinc powder, and from about 0.2 to 8.0 percent by weight of a calcium-containing organic complex.

11. A ceramic ink composition according to claim 10 wherein the metal oxide is an oxide of chrome, cobalt, nickel, manganese, iron, copper, or a mixture thereof.

12. A ceramic ink composition according to claim 10 wherein the glass frit is selected from the group consisting of praseodymium silicate, zirconium silicate or lead borosilicate.

13. A ceramic ink composition according to claim 10 wherein the UV-curable vehicle comprises an acrylate oligomer selected from the group consisting of acrylourethane oligomers, polyester acrylate oligomers, polyether acrylate oligomers and mixtures thereof; a reactive diluent system; and a photoinitiator.

14. A ceramic ink composition according to claim 13 wherein the acrylate oligomer is an acrylourethane oligomer prepared by reacting an olefinically unsaturated compound with an isocyanate-functional urethane formed by the reaction of an excess of a polyisocyanate with a polyol selected from the group consisting of polyether, polyester, polycaprolactone and polyether-ester polyols.

15. A ceramic ink composition according to claim 14 wherein the olefinically unsaturated compound is a lactone-modified acrylate or methacrylate acid ester prepared by reacting an appropriate lactone with an acrylate or methacrylate acid ester.

16. A ceramic ink composition according to claim 13 wherein the reactive diluent system comprises at least one unsaturated addition-polymerizable monomer which is copolymerizable with the acrylate oligomer upon exposure to radiation.

17. A ceramic ink composition according to claim 16 wherein the reactive diluent system comprises unsaturated addition-polymerizable monofunctional and polyfunctional acrylic monomers.

18. A ceramic ink composition according to claim 10 wherein the calcium-containing organic complex is derived from an alkyl benzene sulfonic acid and calcium hydroxide and is present in an amount ranging from about 0.5 to 3.0 percent by weight of the ceramic ink composition.

19. A two-part ceramic ink composition wherein the first part comprises an acrylate oligomer and wherein the second part comprises zinc powder, a calcium-containing organic complex, and a reactive diluent selected from the group consisting of tripropylene glycol diacrylate, polyethylene glycol diacrylate, 2-(2-ethoxy-ethoxy)ethyl acrylate, trimethylol propane propoxylate triacrylate, and mixtures thereof; and wherein a metal oxide, a glass frit, and a photoinitiator are contained in either or both of the two parts.

20. A ceramic ink composition according to claim 19 wherein the first part further comprises additional reactive diluents.

* * * * *